(12) United States Patent
Veyseh et al.

(10) Patent No.: US 11,544,457 B2
(45) Date of Patent: Jan. 3, 2023

(54) MACHINE LEARNING BASED ABBREVIATION EXPANSION

(71) Applicant: Adobe Inc., San Jose, CA (US)

(72) Inventors: Amir Pouran Ben Veyseh, Eugene, OR (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 463 days.

(21) Appl. No.: 16/829,881

(22) Filed: Mar. 25, 2020

(65) Prior Publication Data

US 2021/0303786 A1 Sep. 30, 2021

(51) Int. Cl.
| | |
|---|---|
| *G06F 40/211* | (2020.01) |
| *G06F 40/30* | (2020.01) |
| *G06F 40/253* | (2020.01) |
| *G06N 3/08* | (2006.01) |
| *G06N 3/04* | (2006.01) |

(52) U.S. Cl.
CPC .......... *G06F 40/211* (2020.01); *G06F 40/253* (2020.01); *G06F 40/30* (2020.01); *G06N 3/0445* (2013.01); *G06N 3/08* (2013.01)

(58) Field of Classification Search
CPC ....... G06F 40/30; G06F 40/253; G06F 40/211
See application file for complete search history.

(56) References Cited

U.S. PATENT DOCUMENTS

| | | | | |
|---|---|---|---|---|
| 2018/0293494 A1* | 10/2018 | Guo | ....................... | G06F 40/284 |
| 2018/0329887 A1* | 11/2018 | Bull | .................... | G06F 16/3334 |
| 2019/0386937 A1* | 12/2019 | Kim | ...................... | G06F 40/117 |
| 2020/0104360 A1* | 4/2020 | Gahlot | .................. | G06F 16/374 |
| 2020/0134019 A1* | 4/2020 | Podgorny | ............ | G06N 3/0445 |

(Continued)

OTHER PUBLICATIONS

Yu, Hong, et al., "Using Medline as a Knowledge Source For Disambiguating Abbreviations and Acronyms in Full-Text Biomedical Journal Articles", Journal of Biomedical Informatics 40, 2007, 10 pages.

(Continued)

*Primary Examiner* — Kevin Ky
(74) *Attorney, Agent, or Firm* — Kilpatrick Townsenc & Stockton LLP

(57) ABSTRACT

Techniques are described herein for determining a long-form of an abbreviation using a machine learning based approach that takes into consideration both sequential context and structural context, where the long-form corresponds to a meaning of the abbreviation as used in a sequence of words that form a sentence. In some embodiments, word representations are generated for different words in the sequence of words, and a combined representation is generated for the abbreviation based on a word representation corresponding to the abbreviation, a sequential context representation, and a structural context representation. The sequential context representation can be generated based on word representations for words positioned near the abbreviation. The structural context representation can be generated based on word representations for words that are syntactically related to the abbreviation. The combined representation can be input to a classification neural network trained to output a label representing the long-form of the abbreviation.

20 Claims, 7 Drawing Sheets

(56) References Cited

U.S. PATENT DOCUMENTS

| | | | | |
|---|---|---|---|---|
| 2020/0192973 A1* | 6/2020 | Raghunathan | ........... | G06N 3/04 |
| 2020/0193284 A1* | 6/2020 | Nguyen | ................... | G06N 3/08 |
| 2020/0356726 A1* | 11/2020 | Nelson | .................. | G06F 40/284 |
| 2021/0034707 A1* | 2/2021 | Podgorny | ............. | G06F 40/284 |
| 2021/0049443 A1* | 2/2021 | Klaiman | .............. | G06N 3/0454 |
| 2021/0303786 A1* | 9/2021 | Veyseh | .................... | G06N 3/08 |
| 2022/0269686 A1* | 8/2022 | Bordawekar | .......... | G06N 5/045 |

OTHER PUBLICATIONS

Wu, Yonghui, et al., "Clinical Abbreviation Disambiguation Using Neural Word Embeddings", In Proceedings of Workshop on Biomedical Natural Language processing (BioNLP), Jul. 2015, 6 pages.

Pesaranghader, A., et al., "Deepbiowsd: Effective Deep Neural Word Sense Disambiguation of Biomedical Text Data", . Journal American Medical Informatics Assoc., 2019, 2 pages.

Ciosici, Manuel R., et al., "Unsupervised abbreviation disambiguation", arXiv preprint arXiv:1904.00929, May 2019, 27 pages.

Jin, Qiao, et al., "Deep Contextualized Biomedical Abbreviation Expansion", arXiv preprint arXiv:1906.03360, Jun. 8, 2019, 9 pages.

* cited by examiner

MACHINE LEARNING BASED ABBREVIATION EXPANSION

TECHNICAL FIELD

The present disclosure relates generally to using machine learning to determine the correct long-form or expansion of an abbreviation. In particular, the present disclosure relates to abbreviation expansion based on processing of contextual information by a machine learning model, where the contextual information is derived from a sequence of words in which an abbreviation appears.

BACKGROUND

Automated expansion of abbreviations is a challenging problem for computers because an abbreviation may have several known long-forms. For example, the acronym "CNN" could stand for Cable News Network or Convolutional Neural Network. Therefore, the long-form corresponding to the correct meaning of a particular instance of an abbreviation can be ambiguous, especially if the abbreviation is considered alone without any context. Thus, the task of expanding an abbreviation often involves the subtask of disambiguating the meaning of the abbreviation.

SUMMARY

Embodiments are described herein for determining the correct long-form of an abbreviation using a machine learning based abbreviation expansion system that takes context into consideration. The abbreviation expansion system may apply a machine learning model implemented as a neural network that operates on features extracted from the words in a sentence. For instance, the neural network can operate on sequential context derived from features of words that are positioned near an abbreviation to be expanded. Additionally, in certain embodiments, structural context derived from features of words that are syntactically related to an abbreviation is taken into consideration when expanding the abbreviation.

In certain embodiments, a computer-implemented abbreviation expansion system includes a first neural network, a classification neural network, a sequential context analyzer, a structural context analyzer, and a representation combiner. The first neural network can be a recurrent neural network configured to generate a separate word representation for each word in a sequence of words that form a sentence, with one of the words in the sentence being an abbreviation. The sequential context analyzer is configured to generate a sequential context representation based on word representations corresponding to words that are positioned, in the sequence of words, within a certain distance of the abbreviation. The structural context analyzer is configured to generate a structural context representation based on word representations corresponding to words that are syntactically related, in the sequence of words, to the abbreviation. The representation combiner is configured to generate a combined representation for the abbreviation based on a word representation corresponding to the abbreviation, the sequential context representation, and the structural context representation. The classification neural network is configured to output, based on processing of the combined representation, a label representing a long-form of the abbreviation, where the long-form of the abbreviation corresponds to a meaning of the abbreviation as used in the sequence of words. The classification neural network can be pre-trained using example combined representations and labels representing long-forms associated with the example combined representations.

In certain embodiments, a method performed by a computer system involves identifying, by the computer system, at least one word in a sequence of words as being syntactically related to an abbreviation, the abbreviation being one of the words in the sequence of words. The method further involves generating, by the computer system, a combined representation for the abbreviation based on a word representation corresponding to the abbreviation and further based on at least one word representation corresponding to the at least one word that is syntactically related to the abbreviation. The method further involves determining, by the computer system, a long-form of the abbreviation. The long-form of the abbreviation corresponds to a meaning of the abbreviation as used in the sequence of words. Determining the long-form of the abbreviation may involve inputting the combined representation into a neural network that has been trained using training data comprising a plurality of combined representations, each combined representation in the plurality of combined representations corresponding to an abbreviation in a sequence of words. The training data may further comprise a separate label for each combined representation in the plurality of combined representations, where the label for a combined representation in the plurality of combined representations represents a long-form of the abbreviation corresponding to the combined representation.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
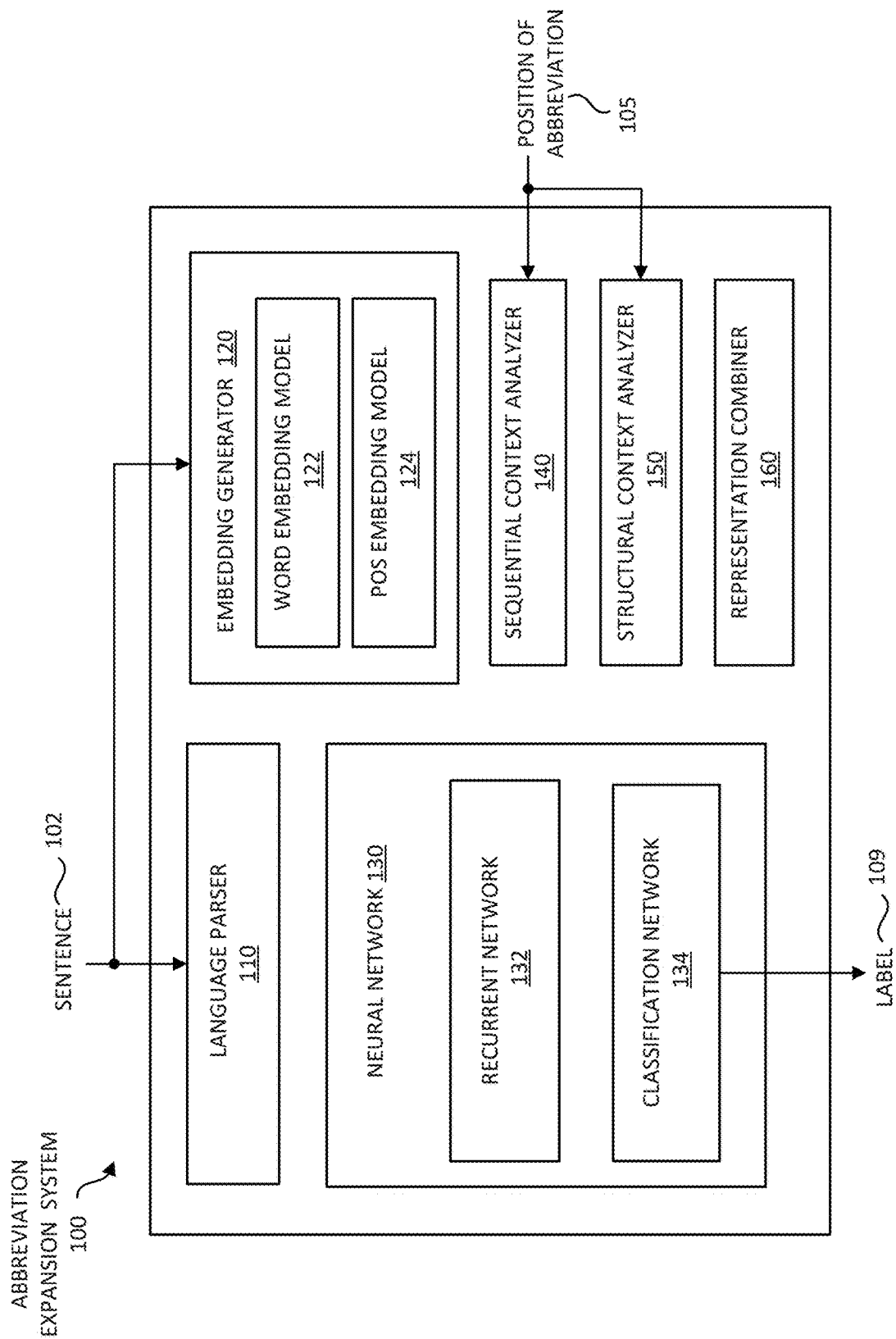
FIG. 1 is a block diagram depicting an abbreviation expansion system, according to certain embodiments.

Embodiments are described herein for determining the correct long-form of an abbreviation using a machine learning based abbreviation expansion system that takes context into consideration. The abbreviation expansion system may apply a machine learning model implemented as a neural network that operates on features extracted from the words in a sentence. For instance, the neural network can operate on sequential context derived from features of words that are positioned near an abbreviation to be expanded. Additionally, in certain embodiments, structural context derived from features of words that are syntactically related to an abbreviation is taken into consideration when expanding the abbreviation.

As used herein, a sentence can be any sequence of words that form a complete sentence, a fragment, or a run-on, with or without punctuation.

One method for expanding an abbreviation is to use a statistical model trained through supervised learning. An alternative to supervised learning is to use an unsupervised approach that relies on pre-defined rules to find the correct expansion. Deep learning based models can also be applied in a supervised setting. However, conventional approaches to abbreviation expansion, even those based on deep learning, fail to take context into consideration or are limited in terms of the types of contextual information considered.

The sequential order of words in a sentence plays an important role in disambiguating the meaning of a particular word in a sentence, and can be helpful in determining which candidate long-form is most likely to be the correct one for a given abbreviation in a given sentence. While sequential context provides substantial information about an abbreviation, a sentence can sometimes include words that are sequentially far from the abbreviation to be expanded. Despite being far from the abbreviation, these words may nevertheless provide information that can help disambiguate the abbreviation. For example, the abbreviation could modify or be modified by a word that is separated from the abbreviation by two or more intervening words. Accordingly, in certain embodiments, both sequential context and structural context are taken into consideration when expanding an abbreviation.

The embodiments described herein can be applied to expand any type of abbreviation. This includes contractions or abbreviations of single words (e.g., "Dr" for doctor, "Prof" for professor) and acronyms or initialisms of multiple words (e.g., "FBI" for Federal Bureau of Investigation, "NASA" for National Aeronautics and Space Administration).

In certain embodiments, a combined representation is generated for an abbreviation, where the combined representation is based on a feature vector representing the abbreviation and further based on feature vectors representing sequential context and structural context. The feature vectors are word representations or combinations of word representations, and can be generated using a neural network that includes a long short-term memory (LSTM) or other form of recurrent neural network. The combined representation is input into a classification neural network that is trained to infer, for each candidate long-form of the abbreviation, a probability value indicating the likelihood that the candidate long-form is the long-form which corresponds to a meaning of the abbreviation as used in a particular sentence. In some implementations, the classification neural network is a logistic regression based classification network.

In certain embodiments, a classification neural network of an abbreviation expansion system is trained on a general domain dataset. Training in a general domain makes the abbreviation expansion system applicable to a wider variety of abbreviations compared to training in a specific domain (e.g., medical or finance). Combined with the use of contextual information, as indicated above, this results in a significant improvement in precision and recall (success rate of expansion) compared to conventional abbreviation expansion techniques.

A neural network is an example of an artificial intelligence computational model (e.g., a machine learning model) comprising multiple nodes or units (sometimes referred to as "perceptrons") arranged in layers. A neural network, including the nodes within the neural network, may be implemented in software only (e.g., code, instructions, program) executed by one or more processors, in hardware, or a combination of hardware and software. Each node in the neural network receives one or more inputs and computes an output. In some instances, the input to a node has an associated weight that is assigned based upon the relative importance of that input to other inputs to that node. Further, in some instances, a node may receive an additional bias input. A node of a neural network is configured to perform a mathematical operation. For example, a node may apply a function "f" (also referred to as an "activation function") to the weighted sum of its inputs and the bias input to generate the output. The activation function can be a linear function or a non-linear function. Accordingly, an output of a node can be represented, in some instances, as $Y=f(w_1 \cdot X_1 + w_2 \cdot X_2 +++b)$, where "xi" is an input to the node, "$w_i$" is the associated weight, "b" is the bias, and "f" is the activation function. Examples of commonly used activation functions include, without restriction, a sigmoid function, a hyperbolic tangent (tanh) function, a rectified linear unit (ReLu) function, and others. The output of a node can be provided as an input to one or more other nodes in the neural network. For example, an output of a node in a particular layer of the neural network can be provided as inputs to nodes of the next layer in the neural network.

The nodes in a neural network may be organized into layers including an input layer, an output layer, and zero or more hidden layers located between the input and output layers. Each layer may comprise one or more nodes. The inputs to nodes in the input layer represent inputs provided to the neural network. The outputs from the one or more nodes in the output layer represent the results or predictions/inferences made by the neural network. The nodes in a layer of a neural network may receive inputs from another layer (e.g., from a previous layer) in the neural network, compute outputs, and forward the outputs to nodes of another layer (e.g., to the next layer) in the neural network.

A neural network typically has to be trained before it can be used for inferencing or making predictions. Training may be performed using labelled training data, where inputs and labels (ground truths) associated with those inputs are known. For example, the training data may include inputs x(i), and for each input x(i), a target value or right answer (also referred to as the ground truth) y(i) for that input. A pair of (x(i), y(i)) is called a training example, and the training data may comprise multiple such training examples. The space of all the inputs x(i) in the training data may be denoted by X, and the space of all the corresponding targets y(i) may be denoted by Y. The goal of the training is to learn a function "h( )" (sometimes referred to as the hypothesis function) that maps the training input space X to the target value space Y (i.e., h: X→Y), such that h(x) is a good predictor for the corresponding value of y. Various techniques may be used to learn this hypothesis function. In some techniques, as part of deriving the hypothesis function, a cost or loss function may be defined that measures the difference between the ground truth value for an input and the value predicted for that input by the neural network. As part of the training, techniques are used to minimize this cost or loss function. Various different training techniques may be used, such as various backpropagation training techniques that iteratively modify/manipulate the weights associated with inputs to the nodes in the neural network, with the goal of minimizing the loss function associated with the output(s) provided by the output layer of the neural network.

FIG. 1 shows an example abbreviation expansion system 100, according to certain embodiments. The system 100 includes a language parser 110, an embedding generator 120, a neural network 130, a sequential context analyzer 140, a structural context analyzer 150, and a representation combiner 160. FIG. 1 is a simplified illustration. The system 100 can include additional components not depicted, such as one or more processors, memory, infrastructure for communications between components internal to the system 100 or communications with external components, and the like.

As depicted in FIG. 1, the system 100 receives input in the form of a sentence 102 (S) and a position 105 (p) of an abbreviation within the sentence. The sentence 102 is a sequence of words S=$w_1, w_2 \ldots w_N$. The sentence 102 can be provided to the system 100 as a standalone sentence or in a block of text comprising multiple sentences. In general, the system 100 can operate on any natural language input and, in some embodiments, may include a component that converts one form of natural language input into another form (e.g., speech-to-text). Depending on the training of the neural network 130, the system 100 can be configured to handle expansion of abbreviations in more than one language. The system 100 is not limited to the English language or alphabetic languages. Instead, the functionality provided by the system 100 can be applied to any natural language.

The position 105 of the abbreviation indicates which word in the sentence corresponds to the abbreviation. The position 105 can be indicated manually by a user of the system 100. Alternatively, in some embodiments, the system 100 can be configured to automatically detect the presence of abbreviations in the sentence 102. For example, the system 100 could identify abbreviations based on capitalization or special characters (e.g., parentheses). The system 100 could also be configured to perform a dictionary lookup of each word in the sentence 102 against a list of known abbreviations.

In some instances, the sentence 102 may include multiple abbreviations. If so, the position of each abbreviation can be manually indicated and/or automatically detected. Although embodiments are described herein in connection with expansion of a single abbreviation within a sentence, similar processing can be performed on additional abbreviations within a sentence to determine the correct long-form for each abbreviation in the sentence.

The output of the system 100 includes a label 109 representing the correct long-form of the abbreviation located at the position 105, that is, the long-form which corresponds to the meaning of the abbreviation as it appears in the context of the sentence 102. Depending on how many long-forms are a potential match (candidates) for the abbreviation, the system 100 may select the label 109 from a set of labels $\{L_1, L_2 \ldots L_m\}$, each label $L_i$ in the set of labels representing a candidate long-form. For instance, as described below, the classification network 134 can assign probability values indicating, for each label in the set of labels, the likelihood that the label represents the correct long-form of the abbreviation. The system 100 can select the label having the highest probability value as the label 109 which represents the correct long-form of the abbreviation at position 105 of the sentence 102.

Language parser 110 is configured to extract part-of-speech (POS) tags from the sentence. The language parser 110 is further configured to generate a parse tree with nodes that are connected based on syntactic relationships between each word in the sentence. Parse trees describe the grammatical role that each word in a sentence plays in the structure of the sentence. For example, a clause in a sentence may include a verb and a noun, where the noun is the subject of the sentence and performs an action corresponding to the verb. A word is syntactically related to another word when there is a relationship between the role performed by the word and the role performed by the other word. Thus, a verb and its associated noun would be syntactically related to each other. The language parser 110 can be implemented using a standard natural language parser. Various language parsers exist which are capable of parsing text in different languages. The parse tree generated by the language parser 110 can be a constituency-based parse tree or a dependency-based parse tree.

Embedding generator 120 includes a word embedding model 122 and a POS embedding model 124. The word embedding model 122 is configured to generate a separate word embedding ($e_i^w$) for each word (w) in the sentence 102. This includes a word embedding for the abbreviation itself. An embedding is a set of values for features of the input from which the embedding was generated. An embedding can be expressed as a multi-dimensional feature vector. Each dimension of the feature vector corresponds to a different feature. Feature vectors can be encoded in various ways including, for example, using a one-hot encoding where each value is either zero or one.

Word embedding model 122 can be a machine learning model trained on a corpus of words from a general domain dataset. Thus, the training data for the word embedding model 122 could encompass words encountered in different types of literature. In one implementation, the word embeddings generated by the word embedding model 122 are 300-dimension GloVe (Global Vectors for Word Representation) embeddings. Other types of word embeddings can also be used.

POS embedding model 124 is configured to generate a POS embedding ($e_i^p$) for each POS tag extracted from the sentence. The POS embedding model 124 can be a machine learning model trained on one or more languages. Examples of POS tags for the English language include singular noun (NN), plural noun (NNS), personal pronoun (PRP), possessive pronoun (PRP$), proper noun (NNP), preposition or subordination conjunction (IN), cardinal number (CD), determiner (DT), base form verb (VB), past tense verb (VBD), and so on.

Each unique POS tag can have a unique POS embedding associated with it. For example, the POS embedding for a personal pronoun would be different from the POS embedding for a possessive pronoun. Similarly, each unique word can have a unique word embedding associated with it. Since there are fewer unique POS tags than there are unique words in any particular language, the sizes of the POS embeddings are typically significantly smaller than that of the word embeddings (e.g., 30 dimensions instead of 300 dimensions).

In contrast to the word embedding model 122, which is trained by inputting words selected from a predefined corpus, the initial training data used to train the POS embedding model 124 can be randomly chosen. For instance, each POS tag can be assigned a random sequence of numbers to generate, based on the random sequence, an initial embedding for the POS tag that is subsequently refined through training. The word embedding for any particular word is refined as a result of adjusting parameters of the word embedding model 122 during training. Similarly, the POS embedding for any particular POS tag is refined as a result of the training of the POS embedding model.

The word embeddings and the POS embeddings are determined in a context independent manner that does not take into consideration the context in which a word appears in a sentence. The word embedding and the POS embeddings can be determined prior to receiving the sentence 102 for processing. For example, the word embeddings and the POS embeddings can be stored in lookup tables in a memory of the system 100. Upon receiving the sentence 102, the embedding generator 120 can look up the corresponding word embedding for each word in the sentence 102. Similarly, the embedding generator 120 can look up the corresponding POS embedding for the POS tag corresponding to a particular word in the sentence 102.

For each word in the sentence 102, the embedding generator 120 can combine the corresponding word embedding with the corresponding POS embedding. For example, the word embedding can be concatenated with the POS embedding to form the combined embedding: $e_i=[e_i^w; e_i^p]$. In this manner, each word in the sentence 102 can have its own combined embedding $e_i$ that incorporates both a word imbedding and a POS embedding.

Neural network 130 includes a recurrent network 132 and a classification network 134 as subnetworks. Additionally, although depicted as separate elements, the sequential context analyzer 140, the structural context analyzer 150, and the representation combiner 160 can also be part of the neural network 130. The recurrent network 132 is configured to generate, using the combined embeddings ($e_1, e_2 \ldots e_N$) produced by the embedding generator 120, a word representation ($h_i$) for each word in the sentence. As explained below, the word representations are used to generate a combined representation for the abbreviation. The combined representation is input to the classification network 134 to determine the label 109.

Recurrent neural networks are a type of neural network that generates outputs taking into consideration previous inputs. In contrast, a feed-forward neural network only considers the current set of inputs, and the output for a given input could always be the same, irrespective of any previous inputs to the feed-forward neural network. Unlike feed-forward neural networks, recurrent neural networks have an internal memory that can allow dependencies between current and previous inputs to affect the output. For example, in a recurrent neural network, certain operations may generate values that are stored internally (e.g., a memory that stores a hidden state associated with a particular node). Such stored values can be used as inputs to other operations performed by the recurrent neural network using later inputs, thereby forming a feedback loop. As applied to embeddings representing words in a sentence, the output of a recurrent network depends on the order in which the embeddings are input to the recurrent network. Therefore, unlike the embeddings $e_i^w$ and $e_i^p$ generated by the embedding models 122, 124, each word representation $h_i$ generated by the recurrent network 132 is dependent upon features of words other than the word for which the word representation $h_i$ is generated.

In certain embodiments, the recurrent network 132 is implemented as a long short-term memory (LSTM) network. More specifically, the recurrent network 132 can include a bi-directional LSTM layer. In a bi-directional LSTM or other form of bi-directional recurrent neural network, the input sequence is processed in both the forward and backward directions, and the results from both directions are combined. The recurrent network 132 can maintain a hidden state for each word. The hidden state is updated each time another combined embedding is processed. For example, the recurrent network 132 can determine the hidden state for a particular word by processing the combined embedding for the first word in the sentence 102 and moving one word at a time until the particular word is reached. Once the particular word is reached, the combined embedding for the particular word is processed taking into consideration the results of the processing of the earlier words. This would produce a final hidden state in the forward direction. Similarly, the recurrent network 132 can produce a final hidden state in the backward direction by processing the combined embedding for the last word in the sentence 102 and moving one word at a time until the particular word is reached. The final hidden states in both directions can then be combined (e.g., concatenated) to form the word representation $h_i$ for the particular word.

The processing performed by the recurrent network 132 can be considered to be context dependent since the word representation $h_i$ for a particular word in the sentence 102 depends on combined embeddings of other words in the sentence and the order in which the other words appear relative to the particular word. However, the word representation for the particular word may be determined primarily based on the combined embedding for the particular word, which is usually weighted more heavily compared to the combined embeddings of the other words. The combined embeddings of the other words usually contribute to a significantly lesser extent. To further emphasize the context, additional contextual representations can be generated to supplement the word representation corresponding to the abbreviation. These additional contextual representations are provided by the sequential context analyzer 140 and the structural context analyzer 150.

Sequential context analyzer 140 is configured to generate a sequential context representation ($C_{Seq}$) for the abbreviation. The sequential context representation is a combination of word representations corresponding to words neighboring the abbreviation. The sequential context analyzer 140 can form the sequential context representation by combining the word representations of all words within a window of a certain size, e.g., a window size of ten to capture word representations for five consecutive words before and five consecutive words after the abbreviation: $C_{Seq}=h_{p-d}, h_{p-d+1} \ldots h_{p-1}, h_{p+1} \ldots h_{p+d}$ where the window is of size $d*2$. The word representations corresponding to the words in the window can be combined by concatenation in the order in which the words appear (e.g., left to right). The size of the window can be anywhere from two to one less than the total number of words in the sentence 102. In some embodiments, the window size is fixed. Alternatively, the sequential context analyzer 140 can employ a window size that varies based on the length of the sentence 102. For example, a larger window may be used for longer sentences and a smaller window used for shorter sentences.

The window size does not dictate the total number of word representations included in the sequential context representation. Instead, the total number of word representations in the sequential context representation may depend on the position 105 of the abbreviation and how many words are before or after the abbreviation. For instance, if the window extends beyond the end of the sentence 102, only word representations up to the last word of the sentence may be included. Similarly, if the window extends beyond the beginning of the sentence 102, only word representations up to the first word of the sentence may be included. In this manner, the sequential context representation can be limited to word representations corresponding to words that belong to the sentence 102 and not, for example, representations corresponding to words in a previous or following sentence.

Structural context analyzer 150 is configured to generate a structural context representation ($C_{Str}$) for the abbreviation. The structural context representation is a combination of the word representations corresponding to words that are syntactically related to the abbreviation. The structural context analyzer 150 can identify syntactically related words based on the parse tree generated by the language parser 110. To identify the syntactically related words, the structural context analyzer 150 can determine, based on the position 105 of the abbreviation, the location of a node representing the abbreviation. Once the location of this node is determined, the structural context analyzer 150 can traverse the tree in all directions (e.g., up and down) to identify nodes connected to the node representing the abbreviation.

In certain embodiments, only direct parents and direct children of the node representing the abbreviation are identified. For each identified node, the structural context analyzer 150 selects the corresponding word representation for use in generating the structural context representation. Thus, the structural context representation can be expressed as $C_{Str} = h_p^p, h_p^{c1}, h_p^{c2} \ldots h_p^{ck}$ where $h_p^p$ is the word representation of the parent and $h_p^{ci}$ is the word representation of the i-th child. The total number of word representations used to generate the structural context representation depends on how many nodes are connected to the node representing the abbreviation. For instance, if the abbreviation corresponds to a root node of the parse tree, then there is no parent. Similarly, if the abbreviation corresponds to a leaf node, then there are no children.

As indicated above, the sizes of the sequential context representation $C_{Seq}$ and the structural context representation $C_{Str}$ can vary from one sentence to another. Max pooling can be used to make the sequential context representation and the structural context representation uniform in size for all possible input sentences. For example, the sequential context analyzer 140 can include a neural network layer configured to perform a max pooling operation that converts the sequential context representation into a fixed sized vector ($\overline{C}_{Seq}$), e.g., a vector having the same number of dimensions as a single word representation. The max pooling operation selects, for each dimension of the fixed sized vector, the largest corresponding value among all the word representations used to form the sequential context representation. Similarly, the structural context analyzer 150 can perform a max pooling operation that converts the structural context representation into a fixed sized vector ($\overline{C}_{Str}$), e.g., a vector of the same size as the vector to which the sequential context representation is converted.

Representation combiner 160 is configured to combine the final sequential context representation $\overline{C}_{Seq}$, the final structural context representation $\overline{C}_{Str}$, and the word representation $h_p$ corresponding to the abbreviation, thereby generating a combined representation ($h'_p$) of the abbreviation. The combined representation can be generated in a similar manner to the combined embeddings, through concatenation of the individual vectors: $h_p' = [h_p; \overline{C}_{Seq}; \overline{C}_{Str}]$.

Classification network 134 is configured to determine, based on the combined representation $h_p'$, probability values for each label that the abbreviation can potentially correspond to. Each label represents a candidate long-form of the abbreviation, but only one candidate is the correct long-form for the abbreviation in the context of the input sentence 102.

The classification network 134 can select the label having the highest probability for output as the label 109. In this manner, the long-form represented by the label 109 will be deemed to be the correct long-form of the abbreviation in the context of the sentence 102.

The classification network 134 is pre-trained to infer the probability values of the labels. Training of the classification network 134 can involve generating a combined representation of an abbreviation in an example sentence and inputting the combined representation into the classification network 134 to generate the label 109 for the example sentence. The output label can be compared to a correct label for the example sentence and, if the labels are not the same, parameters of the classification network 134 (e.g., weight values and/or bias values used in one or more activation functions) can be adjusted through backpropagation. For any particular abbreviation, the classification network 134 can be trained on example sentences where the particular abbreviation has different meanings. For example, a training dataset for the classification network 134 could include hundreds of example sentences that feature the acronym "PDF", including sentences where PDF means probability density function, sentences where PDF means Portable Document Format, sentences where PDF means Personal Data Form, and so on.

In some embodiments, the classification network 134 is a logistic regression based classifier and includes an output layer with a node for each label that represents a candidate long-form. Each node of the output layer of the classification network 134 computes a corresponding probability value using an activation function (e.g., a Softmax function) assigned to the node. During training of the classification network 134, logistic regression is implemented through backpropagation to minimize a loss function (e.g., a log likelihood loss).

According to one implementation, the classification network 134 is a two-layer feed-forward neural network including a first layer and a second layer. The first layer performs a mathematical operation, e.g., a linear function $\overline{h}_p = W_2 * (W_1 * h_p' + b_1) + b_2$, where $W_1$ and $W_2$ are weight matrices and $b_1$ and $b_2$ are bias values. The second layer outputs a probability distribution, where the probability distribution is computed using a Softmax function:

$$P(L_i | x_1, x_2 \ldots x_N, p) = \frac{\exp(W_i * \overline{h}_p)}{\sum_{j=1}^{m} \exp(W_j * \overline{h}_p)}$$

where $W_i$ is a weight matrix of the logistic regression model and is associated with the i-th class/label in a set of labels representing m number of candidate long-forms.

Figure 2:
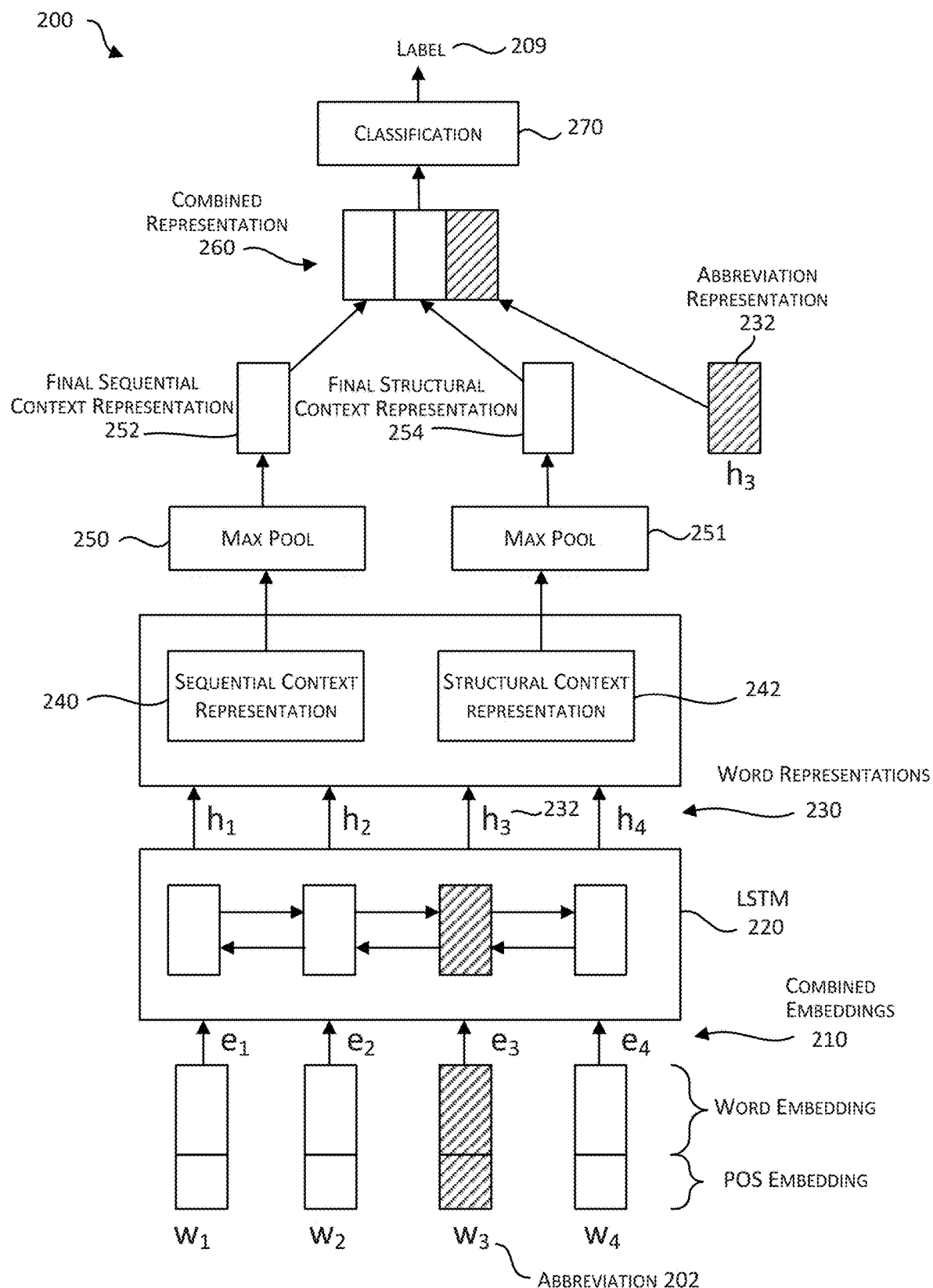
FIG. 2 is data-flow diagram illustrating a process for determining a correct long-form of an abbreviation in a sentence, according to certain embodiments.

FIG. 2 is a data-flow diagram illustrating a process 200 for determining a correct long-form of an abbreviation in a sentence, according to certain embodiments. The process 200 can be performed using an implementation of the abbreviation expansion system 100 in FIG. 1. In the example depicted in FIG. 2, the input to the abbreviation expansion system is a four word sentence ($w_1$ to $w_4$) in which an abbreviation 202 corresponds to the third word ($w_3$). Each word is represented by a combined embedding in a set of combined embeddings 210 ($e_1$ to $e_4$). As described above, a combined embedding can be generated using the embedding models 122, 124 and based on a word embedding and a POS embedding.

The combined embeddings 210 are input to a bi-directional LSTM network 220 corresponding to the recurrent network 132 in FIG. 1. The LSTM network 220 generates word representations 230 ($h_1$ to $h_4$) based on the combined embeddings 210, with a separate word representation for each word $w_1$ to $w_4$. The word representations 230 include a representation 232 ($h_3$) corresponding to the abbreviation 202.

The word representations 230 are selectively combined to generate a sequential context representation 240 and a structural context representation 242. The context representations 240, 242 can be generated in the same manner described above with respect to the operation of the sequential context analyzer 140 and the structural context analyzer 150. The context representations 240 and 242 undergo respective max pooling operations 250 and 251 to convert the context representations 240 and 242 into a final sequential context representation 252 and a final structural context representation 254.

The final sequential context representation 252, the final structural context representation 254, and the abbreviation representation 232 are concatenated to form a combined representation 260 as a final representation of the abbreviation 202. The combined representation undergoes classification processing 270 to determine a label 209 representing the correct long-form of the abbreviation 202. The representations 252, 254, and 232 can be concatenated in any order so long as the order is the same as that in which concatenation was performed earlier to generate combined representations for training a classifier (e.g., the classification network 134) that determines the label 209.

Figure 3:
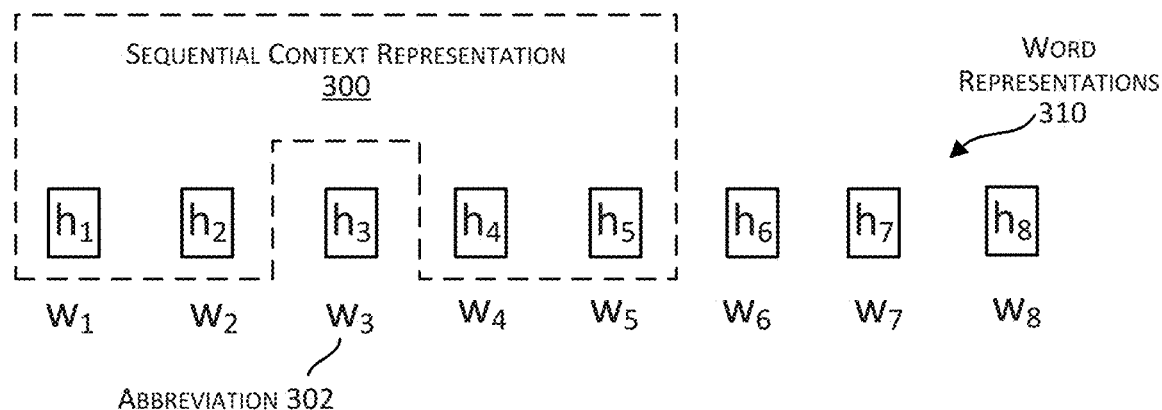
FIG. 3 illustrates the formation of a sequential context representation for an example sentence, according to certain embodiments.

FIG. 3 illustrates the formation of a sequential context representation 300 for an example sentence consisting of eight words, where the third word is an abbreviation 302. The sequential context representation 300 is formed based on applying a window size of four to a set of word representations 310. Since the abbreviation 302 corresponds to the third word in the sentence, the sequential context representation 300 includes word representations ($h_i$ and $h_2$) of the two words before the abbreviation 302 and word representations ($h_4$ and $h_5$) of the two words after the abbreviation 302.

Figure 4:
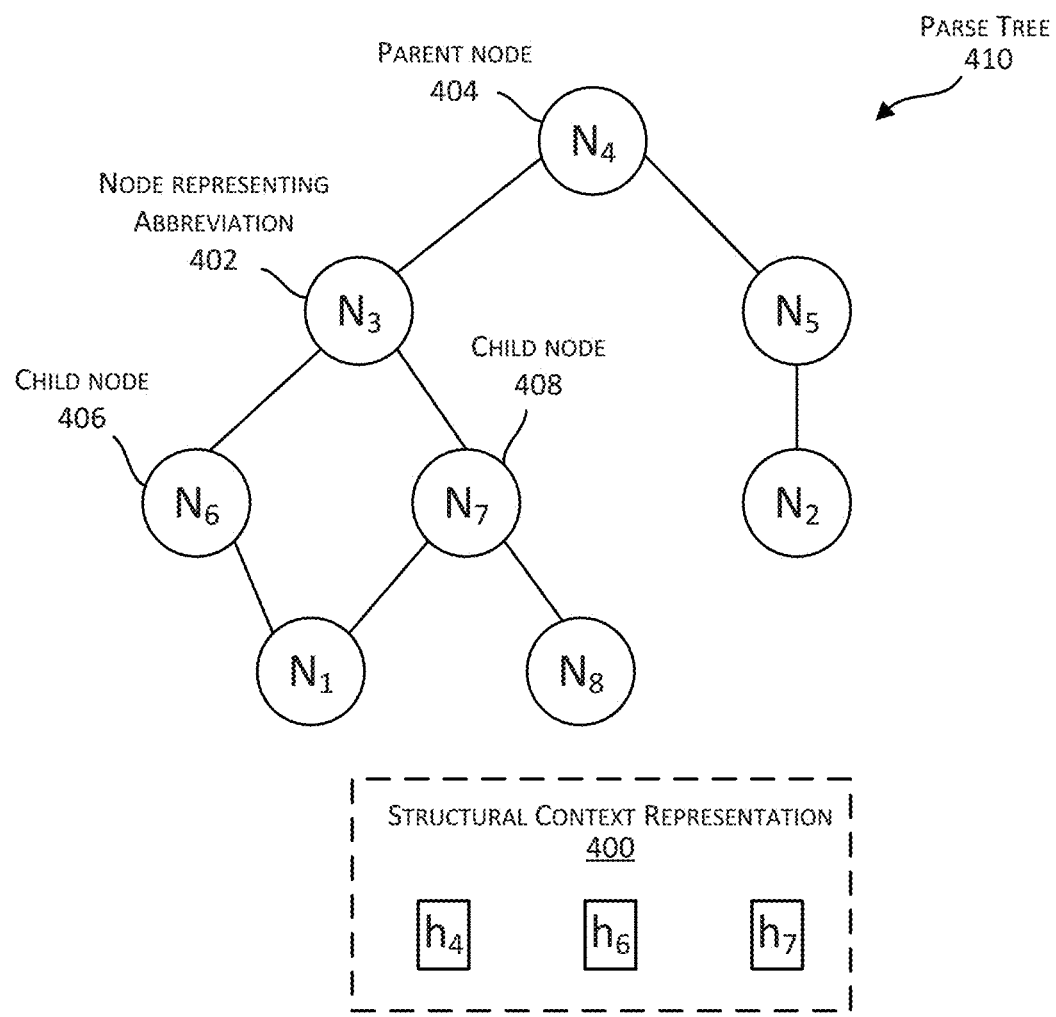
FIG. 4 illustrates the formation of a structural context representation for the same sentence represented in FIG. 3.

FIG. 4 illustrates the formation of a structural context representation 400 for the same sentence represented in FIG. 3. The structural context representation 400 is formed by locating a node 402 in a parse tree 410, where the node 402 represents the abbreviation 302. The node 402 has a parent node 404 that represents the fourth word in the sentence. The node 402 also has two child nodes 406 and 408 representing the sixth and seventh words in the sentence. Accordingly, as shown in FIG. 4, the structural context representation 400 can be formed by combining the word representations associated with the nodes 404, 406, and 408, e.g., word representations to $h_4$, $h_6$, and $h_7$.

Figure 5:
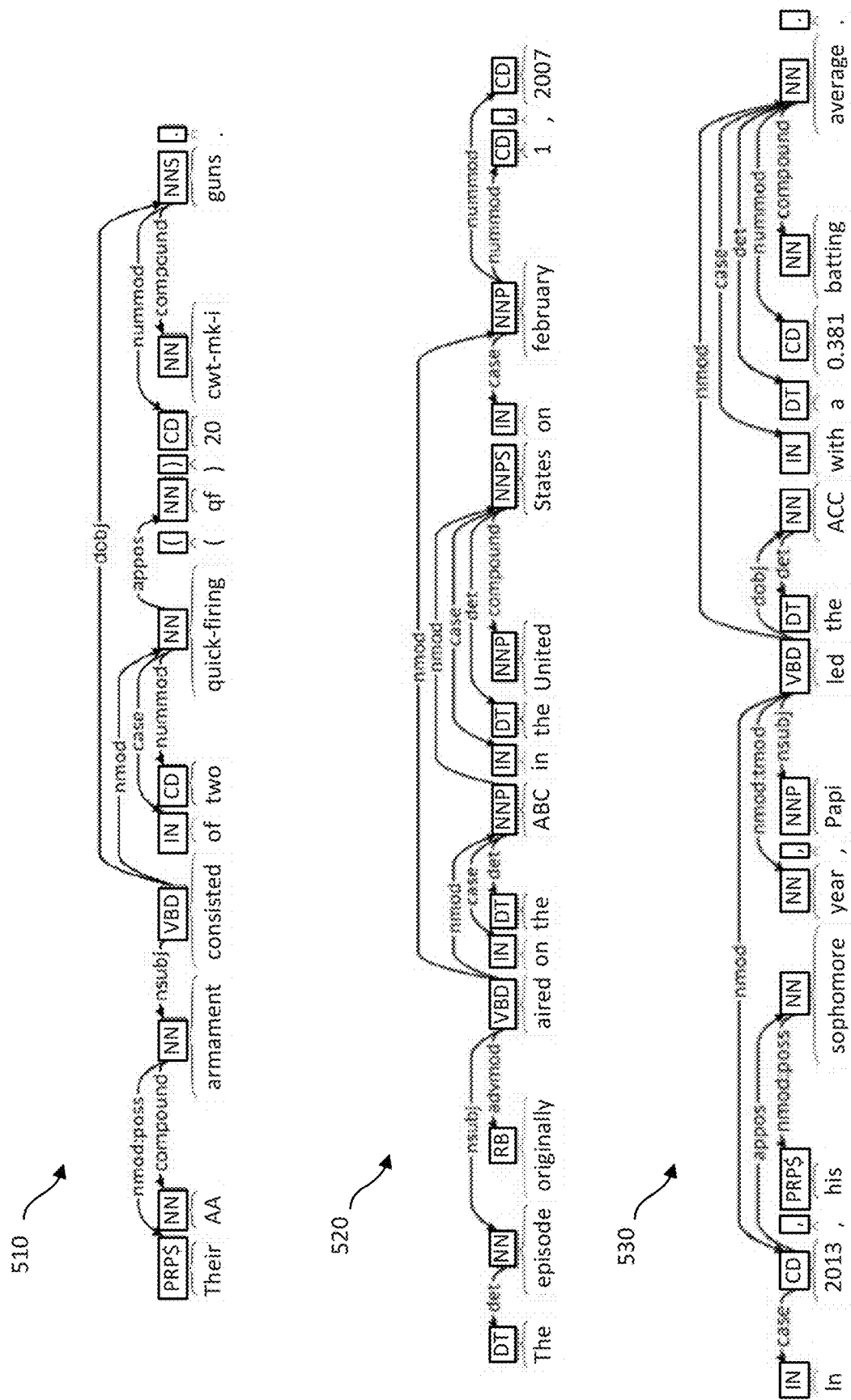
FIG. 5 illustrates example parse trees.

FIG. 5 illustrates example parse trees 510, 520, and 530 generated for three different sentences. The parse trees 510, 520, 530 are discussed below in connection with example nos. 1 to 3. In each of these examples, a window size of ten (five words before the abbreviation and five words after) is used to determine which words to use for generating the sequential context representation.

Example No. 1

Sentence: Their AA armament consisted of two quick-firing (qf) 20 cwt-mk-i guns.
Abbreviation: AA
Candidate long-forms: anti-aircraft, American Association, Alcoholics Anonymous
Correct long-form: anti-aircraft
Long-form probabilities: anti-aircraft (0.81), American Association (0.03), Alcoholics Anonymous (0.16)
Sequential context words: Their, armament, consisted, of, two, quick-firing
Structural context words: armament The parse tree for the sentence in example no. 1 is the parse tree 510. As shown in FIG. 5, the abbreviation "AA" is a noun that forms a compound expression with the word "armament". Therefore, armament is syntactically related to AA in this sentence, and the word representation of armament should be included in the structural context for the abbreviation AA.

Candidate long-forms for the abbreviation AA include "anti-aircraft", "American Association", and "Alcoholics Anonymous". As indicated above, anti-aircraft is the correct long-form in this example. The probability values generated for the labels associated with these long-forms will therefore reflect a higher probability for anti-aircraft (e.g., 81%) than for American Association (e.g., 3%) or Alcoholics Anonymous (e.g., 16%), with the probabilities of all the candidate long-forms adding up to 100%.

Example No. 2

Sentence: The episode originally aired on the ABC in the United States on Feb. 1, 2007.
Abbreviation: ABC
Candidate long-forms: American Broadcasting Company, ATP-binding cassette, Australian Broadcasting Corporation, American Bowling Congress
Correct long-form: American Broadcasting Company
Long-form probabilities: American Broadcasting Company (0.49), ATP-binding cassette (0.06), Australian Broadcasting Corporation (0.32), American Bowling Congress (0.13)
Sequential context words: episode, originally, aired, on, the, in, the, United, States, on
Structural context words: States, on, the, aired The parse tree for the sentence in example no. 2 is the parse tree 520. As shown in FIG. 5, the abbreviation "ABC" is a proper noun that has nominal modifier (nmod) relationships with the verb "aired" and the proper noun "States", a case-marking (case) relationship with the preposition "on", and has "the" as a determiner (det) word.

Example no. 2 illustrates the importance of taking context into consideration. Here, the long-forms "American Broadcasting Company" and "Australian Broadcasting Corporation" are both likely candidates. However, American Broadcasting Company has a slightly higher probability value, perhaps because this long-form is more closely related to the words "United" and "States", as reflected in the trained parameters of the classification neural network that computed the probability values. If the sequential context and/or the structural context were not taken into consideration, the resulting probability values could be ambiguous or misleading. For instance, in the absence of using a structural context representation and/or a sequential context representation to compute the probability values, both of these long-forms could be assigned the same or very similar probability values.

Example No. 3

Sentence: In 2013, his sophomore year, Papi led the ACC with a 0.381 batting average.
Abbreviation: ACC
Candidate long-forms: Air Combat Command, anterior cingulate cortex, Atlantic Coast Conference, Alpine Club of Canada
Correct long-form: Atlantic Coast Conference Long-form probabilities: Air Combat Command (0.21), anterior cingulate cortex (0.18), Atlantic Coast Conference (0.42), Alpine Club of Canada (0.19)

Sequential context words: sophomore, year, Papi, led, the, with, a, 0.381, batting, average Structural context words: led, the The parse tree for the sentence in example no. 3 is the parse tree 530. As shown in FIG. 5, the abbreviation "ACC" is a noun that is a direct object (dobj) of the verb "led" and has "the" as a determiner word.

Example Operations and Computing Environments

Figure 6:
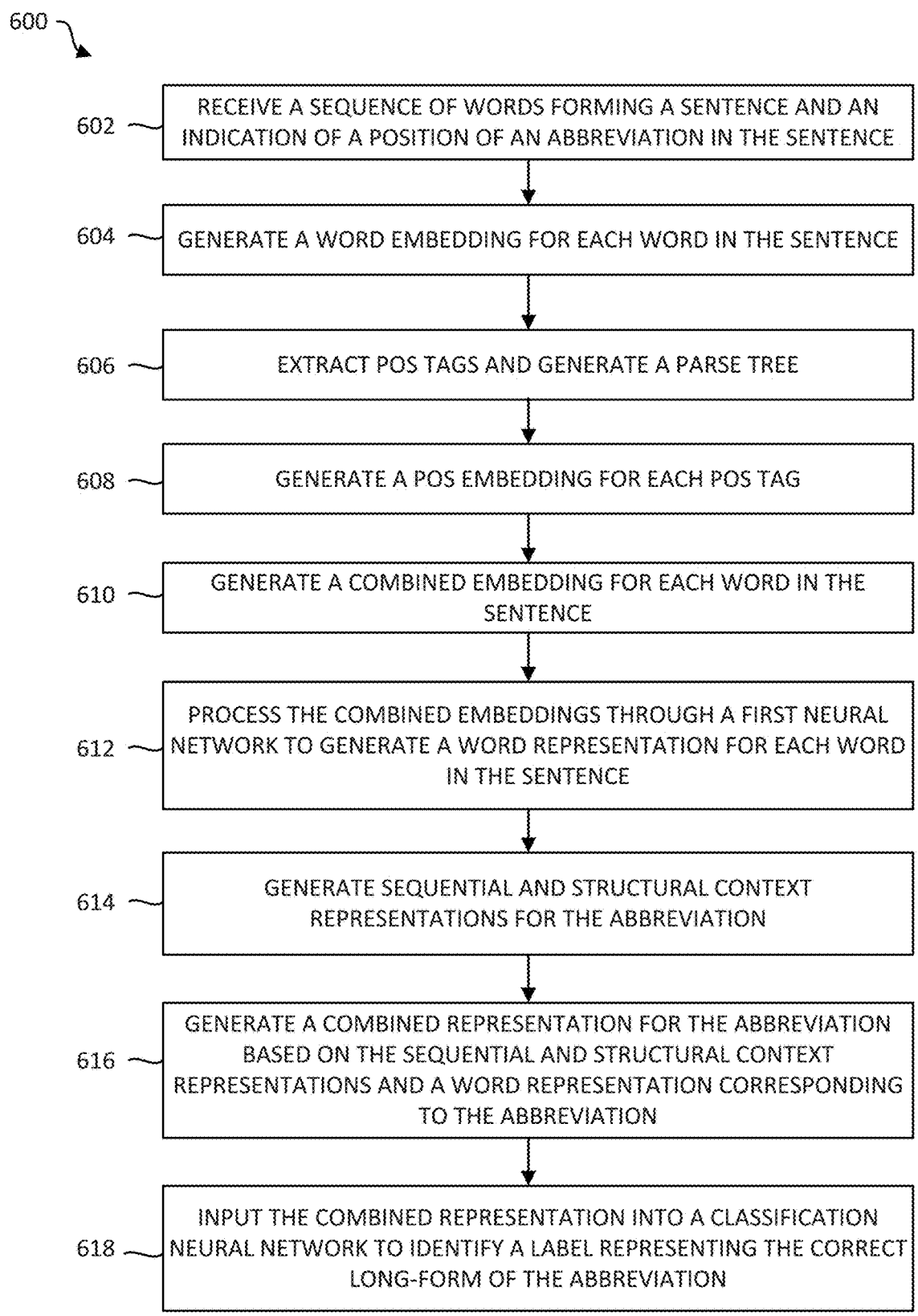
FIG. 6 is a flow chart depicting an example process for determining a correct long-form of an abbreviation, according to certain embodiments.

FIG. 6 is a flow chart depicting an example process 600 for determining a correct long-form of an abbreviation, according to certain embodiments. The operations depicted in FIG. 6 can be implemented by one or more computing devices executing suitable program code (e.g., code for implementing the abbreviation expansion system 100 on one or more processors of a computer system). For illustrative purposes, the process 600 is described with reference to certain examples depicted in the figures. Other implementations, however, are possible.

At block 602, a sequence of words forming a sentence is received. The sentence is received together with an indication of a position of an abbreviation in the sentence. The sentence received at 602 can include multiple abbreviations. If so, then the positions of more than one abbreviation may be indicated, and the processing depicted in subsequent blocks (e.g., blocks 614 to 618) can be repeated to determine long-forms for each abbreviation indicated.

At block 604, a word embedding is generated for each word in the sentence received at 602. Each word embedding can be a feature vector (e.g., a 300-dimension vector) generated as a result of inputting a corresponding word into a word embedding model (e.g., word embedding model 122). As mentioned earlier, in some embodiments, the word embeddings are pre-generated and stored for subsequent retrieval using a word lookup. Therefore, the generating at 604 may involve a series of lookup operations.

At block 606, POS tags are extracted. Each word in the sentence corresponds to a part-of-speech. A corresponding POS tag can be generated for each part-of-speech in the sentence. In some instances, different words may correspond to the same part-of-speech. For example, the sentence received at 602 can include multiple nouns, verbs, cardinal numbers, and so on. Therefore, different words may share the same POS tag.

Additionally, at block 606, a parse tree is generated for the sentence. The parse tree and the POS tags can both be generated by inputting the sentence into a language parser (e.g., language parser 110). The parse tree includes, for each word in the sentence, a corresponding node representing the word. In the example parse trees depicted in FIG. 5, the nodes are labeled according to parts-of-speech. The nodes of the parse tree are connected according to syntactical relationships between the words of the sentence. Examples of syntactical relationships, such as nominal modifier, case-marking, and determiner relationships, were described above in connection with FIG. 5.

At block 608, a POS embedding is generated for each POS tag. Each POS embedding can be a feature vector (e.g., a 30-dimension vector) generated as a result of inputting a corresponding POS tag into a POS embedding model (e.g., POS embedding model 124). As with the word embeddings generated in 604, the POS embeddings can be pre-generated and stored for lookup.

At block 610, a combined embedding is generated for each word in the sentence. The combined embeddings can be generated by, for each word, combining (e.g., concatenating) a corresponding word embedding and a corresponding POS embedding. In this manner, each word can have its own combined embedding.

At block 612, the combined embeddings generated at 610 are processed through a first neural network (e.g., recurrent network 132) to generate a word representation for each word in the sentence. When implemented as a recurrent neural network, the first neural network processes the combined embeddings according to the sequential order of the words. For example, as described above with respect to the embodiment of FIG. 2, the recurrent neural network can be a bi-directional LSTM network that processes combined embeddings in both a forward direction and a backward direction. The first neural network may be configured to reduce the dimensionality of the combined embeddings. For instance, the first neural network may generate each word representation as a 200-dimension vector.

At block 614, a sequential context representation and a structural context representation are generated for the abbreviation. The sequential context representation can be generated by combining (e.g., concatenating) word representations corresponding to words within a certain distance of the abbreviation. For example, a window size of ten can be applied to concatenate up to ten word representations corresponding to five words preceding the abbreviation and five words following the abbreviation.

The structural context representation can be generated by combining (e.g., concatenating) word representations corresponding to words that are syntactically related to the abbreviation. The syntactical relationships can be determined by examining the parse tree generated at 606. As discussed above, in certain embodiments, only words represented by parse tree nodes that are directly connected to a node representing the abbreviation are considered for generating the structural context representation. However, in other embodiments, words represented by nodes that are farther from the node representing the abbreviation can be used. For example, the structural context representation could be generated based on word representations associated with nodes that are two or more levels away, e.g., a parent of a parent node or a child of a child node.

Additionally, as discussed above, the sequential context representation and the structural context representation can be generated as fixed sized vectors by applying max pooling operations to the combined word representations. Since the number of words that are within a certain distance of the abbreviation and the number of words that are syntactically related can vary depending on the sentence, max pooling would ensure that sequential context representations and structural context representations are uniform in size across sentences.

At block 616, a combined representation is generated for the abbreviation based on the sequential and structural context representations generated at 614 and further based on a word representation corresponding to the abbreviation. The word representation corresponding to the abbreviation is one of the word representations generated at 612. The combined representation can be generated, for example, as a concatenation of these three representations.

At block 618, the combined representation generated at 616 is input into a classification neural network (e.g., classification network 134) to identify a label representing the correct long-form of the abbreviation. As discussed above, the classification neural network can be a logistic regression based network that is pre-trained on example combined representations. The classification neural network can compute a separate probability value for each label in a set of labels representing candidate long-forms of the abbreviation. Once the probability values have been computed, the classification neural network can select the label having the highest probability value for output as the label representing the correct long-form, i.e., the long-form corresponding to the meaning of the abbreviation as used in the sentence received at 602. Each of the candidate long-forms is a known long-form of the abbreviation. However, only one of the candidate long-forms may correspond to the meaning of the abbreviation as used in the context of the sentence received at 602.

To train the classification neural network, combined representations can be generated from example sentences containing abbreviations, in the same manner as the combined representation generated at 616. Each example combined representation can then be input into the classification neural network one at a time to generate output labels. Each time an output label is generated, the output label can be compared to a "golden label" representing the correct long-form for the combined representation that was used to generate the output label. If the labels do not match, then the parameters of the classification neural network are adjusted through backpropagation. For instance, in the two-layer feed-forward implementation of the classification network 134 described earlier, values for weights and/or biases employed by one or more of the two layers can be adjusted up or down at a specified learning rate.

Once the label representing the correct long-form of the abbreviation has been identified, the correct long-form can be used in any number of downstream processing operations. For instance, if the sentence received at 602 is part of a computer document, a computer system that performs the process 600 can update the document to substitute the correct long-form for the abbreviation. Since the correct long-form is context dependent, such substitution can be performed locally on the portion of the document that corresponds to the sentence. This would make the document more understandable to a person reading the document while also avoiding incorrect substitutions. For example, if the document contained multiple instances of the same abbreviation, but with different meanings, a global substitution would introduce errors since the abbreviation is not used consistently.

Another example of a downstream operation for the correct long-form is to output the correct long-form to a user through a display device. For instance, the sentence could be part of an electronic book viewed on the display device, and could be received in 602 as part of a request from the user to identify the meaning of an abbreviation that the user encountered while reading the electronic book. The correct long-form could be displayed as an annotation, possibly together with a dictionary definition or a user selectable link to a web resource (e.g., an encyclopedia article) relating to the correct long-form.

Figure 7:
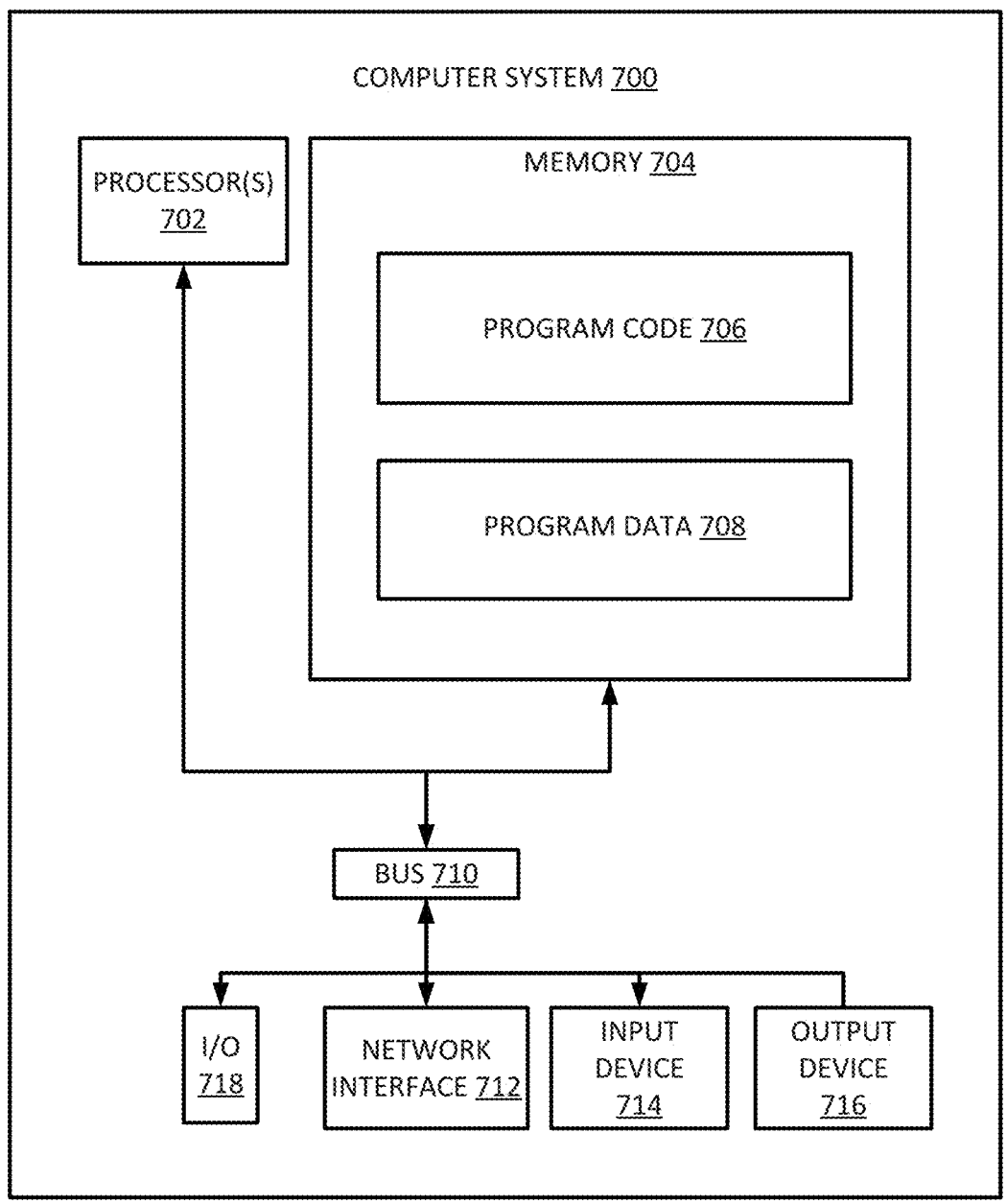
FIG. 7 depicts an example of a computer system for implementing certain embodiments of the present disclosure.

Any suitable computer system or group of computer systems can be used for performing the operations described herein. For example, FIG. 7 depicts an example of an computer system 700 usable for implementing the abbreviation expansion system 100 in FIG. 1. In an embodiment, a single computer system 700 having devices similar to those depicted in FIG. 7 (e.g., a processor, a memory, etc.) combines the various components depicted as separate subsystems in FIG. 1 (e.g., language parser 110, embedding generator 120, neural network 130, etc.).

The depicted example of the computer system 700 includes one or more processors 702 communicatively coupled to one or more memory devices 704. The processor(s) 702 execute computer-executable program code stored in a memory device 704, access information stored in the memory device 704, or both. Examples of a processor 702 include a microprocessor, an application-specific integrated circuit ("ASIC"), a field-programmable gate array ("FPGA"), or any other suitable processing device. The processor(s) 702 can include any number of processing devices, including a single processing device.

The memory device 704 includes any suitable non-transitory computer-readable medium for storing program code 706, program data 708, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory device 704 can be volatile memory, non-volatile memory, or a combination thereof.

The computer system 700 executes program code 706 that configures the processor(s) 702 to perform one or more of the operations described herein. Examples of the program code 706 include, in various embodiments, program code implementing functionality associated with the abbreviation expansion system 100, or any other suitable systems or subsystems that perform one or more operations described herein. The program code 706 may be resident in the memory device 704 or any suitable computer-readable medium and may be executed by the processor(s) 702 or any other suitable processor.

The program code 706 can include instructions that, when executed by the processor(s) 702, cause the processor(s) 702 to perform operations of the program code 706. When being executed, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In certain embodiments, the program data 708 includes data for training a neural network (e.g., training data for the classification network 134), configuration data for a neural network (e.g., pre-training or post-training weights and biases), pre-generated embeddings (e.g., word embeddings and/or POS embeddings), long-form labels, or any combination thereof.

In certain embodiments, the program code 706 and/or the program data 708 are distributed across multiple memory devices 704 that are accessible via a data network. One or more buses 710 are also included in the computer system 700. The buses 710 communicatively couple components of the computer system 700 to each other and/or to external components.

In certain embodiments, the computer system 700 includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices (e.g., a computing device performing a downstream operating on a long-form determined by the computer system 700) via a data network using the network interface device 712.

The computer system 700 may also include a number of external or internal devices, an input device 714, an output device 716, or other input or output devices. For example, the computer system 700 is shown with one or more input/output ("I/O") interfaces 718. An I/O interface 718 can receive input from input devices or provide output to output devices. An input device 714 can include any device or group of devices suitable for receiving visual, auditory, or other suitable input that controls or affects the operations of the processor(s) 702. Non-limiting examples of the input device 714 include a touchscreen, a mouse, a keyboard, a microphone, a separate mobile computing device, etc. An output device 716 can include any device or group of devices suitable for providing visual, auditory, or other suitable sensory output. Non-limiting examples of the output device 716 include a touchscreen, a monitor, a speaker, a separate mobile computing device, etc.

Although FIG. 7 depicts the input device 714 and the output device 716 as being local to the computer system 700, other implementations are possible. For instance, in some embodiments, one or more of the input device 714 and the output device 716 can include a remote client-computing device that communicates with the computer system 700 via the network interface device 712 using one or more data networks described herein.

Figure 8:
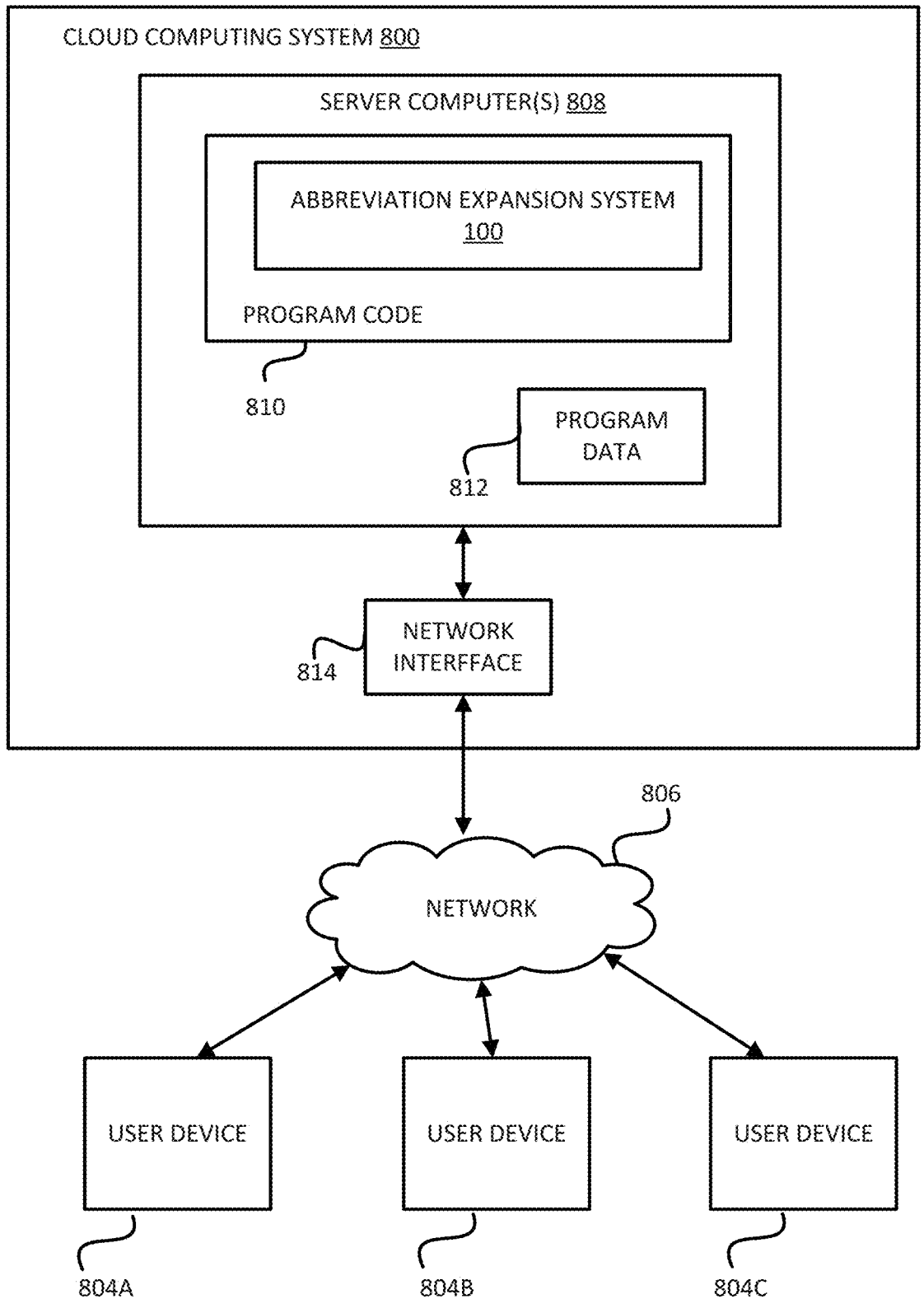
FIG. 8 depicts an example of a cloud computing system for implementing certain embodiments of the present disclosure.

In some embodiments, the functionality provided by the abbreviation expansion system 100 may be offered as cloud services by a cloud service provider. For example, FIG. 8 depicts an example of a cloud computing system 800 offering one or more abbreviation expansion related services that can be used by a number of user subscribers using user devices 804A, 804B, and 804C across a network 806. In certain embodiments, the abbreviation expansion related services provided by cloud computing system 800 include a service that determines the correct long-forms of abbreviations in sentences supplied by the user devices 804A to 804C. In some cases, the abbreviation expansion related services may be offered under a Software as a Service (SaaS) model. One or more users may subscribe to the abbreviation expansion related services, and the cloud computing system performs the processing to provide the abbreviation expansion related services to subscribers. The cloud computing system 800 may include one or more remote server computers 808.

The remote server computers 808 include any suitable non-transitory computer-readable medium for storing program code 810 (e.g., code for the abbreviation expansion system 100), program data 812, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 808 can include volatile memory, non-volatile memory, or a combination thereof.

One or more of the servers 808 execute the program code 810 to configure one or more processors of the server computers 808 to perform one or more of the operations that provide abbreviation expansion related services. Any other suitable systems or subsystems that perform one or more operations described herein can also be implemented by the cloud computing system 800.

The program code 810 and/or program data 812 may be resident in a memory device of the server computers 808 or any suitable computer-readable medium and may be executed by the processors of the server computers 808 or any other suitable processor. In certain embodiments, the program data 812 includes any of the data described in connection with program data 708 in FIG. 7. The program data 812 can be stored on the same memory device or distributed across different memory devices accessible via the network 806.

The cloud computing system 800 also includes a network interface device 814 that enables communications to and from cloud computing system 800. In certain embodiments, the network interface device 814 includes any device or group of devices suitable for establishing a wired or wireless data connection to the network 806. Non-limiting examples of the network interface device 814 include an Ethernet network adapter, a modem, and/or the like. The cloud computing system 800 is able to communicate with the user devices 804A to 804C via the network 806 using the network interface device 814.

General Considerations

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Numerous specific details are set forth herein to provide a thorough understanding of the claimed subject matter. However, the claimed subject matter may be practiced without these specific details. Further, while the present subject matter has been described with respect to specific embodiments thereof, alternatives to, variations of, and equivalents to such embodiments are possible. Accordingly, it should be understood that the present disclosure has been presented for purposes of example rather than limitation, and does not preclude the inclusion of such modifications, variations, and/or additions to the present subject matter.

The invention claimed is:

1. A method comprising:
   identifying, by a computer system, at least one word in a sequence of words as being syntactically related to an abbreviation, the abbreviation being one of the words in the sequence of words;
   generating, by the computer system, a combined representation for the abbreviation based on a word representation corresponding to the abbreviation and further based on at least one word representation corresponding to the at least one word that is syntactically related to the abbreviation; and
   determining, by the computer system, a long-form of the abbreviation, wherein the long-form of the abbreviation corresponds to a meaning of the abbreviation as used in the sequence of words, and wherein determining the long-form of the abbreviation comprises inputting the combined representation into a neural network that has been trained using training data comprising a plurality of combined representations, each combined representation in the plurality of combined representations corresponding to an abbreviation in a sequence of words, the training data further comprising a separate label for each combined representation in the plurality of combined representations, wherein the label for a combined representation in the plurality of combined representations represents a long-form of the abbreviation corresponding to the combined representation.

2. The method of claim 1, further comprising:
   generating, by the computer system, word representations for words in the sequence of words, wherein generating a word representation for a particular word in the sequence of words comprises combining a corresponding word embedding and a corresponding part-of-speech embedding into a combined embedding.

3. The method of claim 2, wherein generating, by the computer system, word representations for words in the sequence of words further comprises:
   inputting combined embeddings into a recurrent neural network that generates the word representation for the particular word in the sequence of words based on the combined embedding for the particular word and further based on combined embeddings for other words in the sequence of words.

4. The method of claim 3, wherein the recurrent neural network is a bi-directional, long short-term memory network that processes the combined embeddings in a forward direction and a backward direction, according to a sequential order of the words in the sequence of words.

5. The method of claim 1, wherein generating, by the computer system, a combined representation for the abbreviation further comprises:
   identifying at least one word that is positioned, in the sequence of words, within a certain distance of the abbreviation;
   generating a sequential context representation based on at least one word representation corresponding to the at least one word that is positioned within a certain distance of the abbreviation; and
   combining the sequential context representation with the word representation corresponding to the abbreviation and the at least one word representation corresponding to the at least one word that is syntactically related to the abbreviation.

6. The method of claim 5, wherein generating, by the computer system, a combined representation for the abbreviation further comprises:
   generating a structural context representation based on the at least one word representation corresponding to the at least one word that is syntactically related to the abbreviation; and
   forming the combined representation as a concatenation of the word representation corresponding to the abbreviation, the sequential context representation, and the structural context representation.

7. The method of claim 6, wherein generating, by the computer system, a combined representation for the abbreviation comprises:
   applying max pooling operations to generate the sequential context representation and the structural context representation as fixed sized vectors.

8. The method of claim 1, wherein generating, by the computer system, a combined representation for the abbreviation comprises:
   generating a parse tree that includes, for each word in the sequence of words, a node representing the word, wherein syntactical relationships between the words in the sequence of words are indicated by connections between nodes of the parse tree;
   locating a node representing the abbreviation;
   identifying nodes that are connected to the node representing the abbreviation;
   generating a structural context representation by concatenating word representations corresponding to words represented by the nodes that are connected to the node representing the abbreviation; and
   combining the structural context representation with the word representation corresponding to the abbreviation.

9. The method of claim 1, wherein determining, by the computer system, a long-form of the abbreviation comprises:
   computing, using the neural network, a separate probability value for each label in a set of labels representing candidate long-forms of the abbreviation; and
   identifying a label having a highest probability value as being a label representing the long-form of the abbreviation.

10. The method of claim 1, wherein the neural network is a logistic regression based classification network.

11. A non-transitory computer-readable medium having program code stored thereon, the program code executable by one or more processors for performing operations comprising:
   generating a sequential context representation based on word representations corresponding to words that are positioned, in a sequence of words, within a certain distance of an abbreviation, the abbreviation being one of the words in the sequence of words;
   generating a structural context representation based on word representations corresponding to words that are syntactically related, in the sequence of words, to the abbreviation;
   generating a combined representation for the abbreviation based on a word representation corresponding to the abbreviation, the sequential context representation, and the structural context representation;
   inputting the combined representation into a neural network that has been trained using training data comprising a plurality of combined representations, each combined representation in the plurality of combined representations corresponding to an abbreviation in a sequence of words, the training data further comprising a separate label for each combined representation in the plurality of combined representations, wherein the label for a combined representation in the plurality of combined representations represents a long-form of the abbreviation corresponding to the combined representation; and
   determining, based on an output of the neural network, a long-form of the abbreviation, wherein the long-form of the abbreviation corresponds to a meaning of the abbreviation as used in the sequence of words.

12. The non-transitory computer-readable medium of claim 11, further comprising:
   combining, for each word in the sequence of words, a corresponding word embedding and a corresponding part-of-speech embedding into a combined embedding; and
   inputting combined embeddings into a recurrent neural network that generates a word representation for a particular word in the sequence of words based on a combined embedding for the particular word and further based on combined embeddings for other words in the sequence of words.

13. The non-transitory computer-readable medium of claim 11, wherein generating a sequential context representation based on word representations corresponding to words that are positioned, in the sequence of words, within a certain distance of the abbreviation comprises:
   concatenating a word representation corresponding to a word preceding the abbreviation and a word representation corresponding to a word following the abbreviation.

14. The non-transitory computer-readable medium of claim 11, wherein generating a structural context representation based on word representations corresponding to words that are syntactically related, in the sequence of words, to the abbreviation comprises:
   generating a parse tree that includes, for each word in the sequence of words, a node representing the word, wherein syntactical relationships between the words in the sequence of words are indicated by connections between nodes of the parse tree;
   locating a node representing the abbreviation;
   identifying nodes that are connected to the node representing the abbreviation; and
   concatenating word representations corresponding to words represented by the nodes that are connected to the node representing the abbreviation.

15. The non-transitory computer-readable medium of claim 11, wherein determining, based on an output of the neural network, a long-form of the abbreviation comprises:
   computing, using the neural network, a separate probability value for each label in a set of labels representing candidate long-forms of the abbreviation; and
   identifying a label having a highest probability value as being a label representing the long-form of the abbreviation.

16. A computer system comprising:
   a first neural network configured to generate a separate word representation for each word in a sequence of words, one of the words in the sequence of words being an abbreviation;
   a sequential context analyzer configured to generate a sequential context representation based on word representations corresponding to words that are positioned, in the sequence of words, within a certain distance of the abbreviation;
   a structural context analyzer configured to generate a structural context representation based on word representations corresponding to words that are syntactically related, in the sequence of words, to the abbreviation;
   a representation combiner configured to generate a combined representation for the abbreviation based on a word representation corresponding to the abbreviation, the sequential context representation, and the structural context representation; and
   a classification neural network configured to output, based on processing of the combined representation, a label representing a long-form of the abbreviation, wherein the long-form of the abbreviation corresponds to a meaning of the abbreviation as used in the sequence of words, and wherein the classification neural network is pre-trained using training data comprising a plurality of combined representations, each combined representation in the plurality of combined representations corresponding to an abbreviation in a sequence of words, the training data further comprising a separate label for each combined representation in the plurality of combined representations, wherein the label for a combined representation in the plurality of combined representations represents a long-form of the abbreviation corresponding to the combined representation.

17. The computer system of claim 16, further comprising:
   an embedding generator configured to:
      generate a separate word embedding for each word in the sequence of words;
      generate a separate part-of-speech embedding for each part-of-speech in the sequence of words; and
      combine, for each word in the sequence of words, a corresponding word embedding and a corresponding part-of-speech embedding into a combined embedding, wherein the first neural network is a recurrent neural network configured to generate word representations based on the combined embeddings.

18. The computer system of claim 16, wherein to generate the combined representation for the abbreviation, the representation combiner is configured to concatenate the word representation corresponding to the abbreviation, the sequential context representation, and the structural context representation.

19. The computer system of claim 16, further comprising:
a language parser configured to generate a parse tree that includes, for each word in the sequence of words, a node representing the word, wherein syntactical relationships between the words in the sequence of words are indicated by connections between nodes of the parse tree;
wherein to generate the structural context representation, the structural context analyzer is configured to:
  locate a node representing the abbreviation;
  identify nodes that are connected to the node representing the abbreviation; and
  concatenate word representations corresponding words represented by the nodes that are connected to the node representing the abbreviation.

20. The computer system of claim 16, wherein the classification neural network is configured to:
compute a separate probability value for each label in a set of labels representing candidate long-forms of the abbreviation; and
identify a label having a highest probability value as being the label representing the long-form of the abbreviation.

* * * * *